United States Patent
Wang (10) Patent No.: US 11,321,471 B2
(45) Date of Patent: May 3, 2022

(54) ENCRYPTED STORAGE OF DATA (71) Applicant: Beijing Sankuai Online Technology Co., Ltd, Beijing (CN)

(72) Inventor: Tao Wang, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 112 days.

(21) Appl. No.: 16/955,129

(22) PCT Filed: Nov. 23, 2018

(86) PCT No.: PCT/CN2018/117234
§ 371 (c)(1),
(2) Date: Jun. 18, 2020

(87) PCT Pub. No.: WO2019/120038
PCT Pub. Date: Jun. 27, 2019

(65) Prior Publication Data
US 2020/0342121 A1     Oct. 29, 2020

(30) Foreign Application Priority Data

Dec. 18, 2017  (CN) .......................... 201711366203.2
Dec. 18, 2017  (CN) .......................... 201711366204.7

(51) Int. Cl.
*G06F 21/60* (2013.01)
*H04L 9/08* (2006.01)
*H04L 9/14* (2006.01)

(52) U.S. Cl.
CPC .......... *G06F 21/602* (2013.01); *H04L 9/0861* (2013.01); *H04L 9/14* (2013.01)

(58) Field of Classification Search
CPC . G06F 21/602; G06F 21/6218; H04L 9/0861; H04L 9/14; H04L 9/088; H04L 9/085
See application file for complete search history.

(56) References Cited

U.S. PATENT DOCUMENTS

2005/0198529 A1* 9/2005 Kitani .............. G11B 20/00188
                                                     726/22
2010/0172501 A1 7/2010 Tian et al.
(Continued)

FOREIGN PATENT DOCUMENTS

CA       2962432 A1      3/2016
CN     101719205 A       6/2010
(Continued)

OTHER PUBLICATIONS

State Intellectual Property Office of the People's Republic of China, Decision of Rejection Issued in Application No. 2017113662032, dated Mar. 2, 2021, 22 pages, (Submitted with Machine Translation).

(Continued)

*Primary Examiner* — Abiy Getachew
(74) *Attorney, Agent, or Firm* — Kilpatrick Townsend & Stockton, LLP (57) ABSTRACT

Disclosed is a method of encrypted storage of data, applied to a client having an application (APP) installed thereon. The method includes: generating an encryption key based on a preset algorithm; dividing the encryption key into m portions, and respectively storing the portions in m media of the client, where m is a natural number greater than 1; and encrypting target data by using the encryption key.

15 Claims, 6 Drawing Sheets

(56) References Cited

U.S. PATENT DOCUMENTS

| | | | |
|---|---|---|---|
| 2012/0163581 A1 | 6/2012 | Lieber et al. | |
| 2012/0163590 A1 | 6/2012 | Lieber et al. | |
| 2014/0006797 A1* | 1/2014 | Cordelia | G06F 12/1408 |
| | | | 713/189 |
| 2016/0057115 A1 | 2/2016 | Abuelsaad et al. | |
| 2016/0306750 A1* | 10/2016 | Tucker | H04L 9/0869 |
| 2017/0163652 A1* | 6/2017 | Peppe | G06F 21/6245 |
| 2020/0125502 A1* | 4/2020 | Durham | G06F 12/0646 |
| 2020/0387615 A1* | 12/2020 | Yeo | G06F 3/064 |

FOREIGN PATENT DOCUMENTS

| | | |
|---|---|---|
| CN | 102891876 A | 1/2013 |
| CN | 103283177 A | 9/2013 |
| CN | 103392178 A | 11/2013 |
| CN | 103455764 A | 12/2013 |
| CN | 103716148 A | 4/2014 |
| CN | 104254858 A | 12/2014 |
| CN | 104579627 A | 4/2015 |
| CN | 104601325 A | 5/2015 |
| CN | 105100115 A | 11/2015 |
| CN | 105320613 A | 2/2016 |
| CN | 105337722 A | 2/2016 |
| CN | 105809066 A | 7/2016 |
| CN | 106326768 A | 1/2017 |
| CN | 106372519 A | 2/2017 |
| CN | 106411515 A | 2/2017 |
| CN | 106850208 A | 6/2017 |
| CN | 106874743 A | 6/2017 |
| CN | 106909851 A | 6/2017 |
| CN | 107273755 A | 10/2017 |
| TW | I242965 B | 11/2005 |
| WO | 2013041394 | 3/2013 |

OTHER PUBLICATIONS

State Intellectual Property Office of the People's Republic of China, Office Action and Search Report Issued in Application No. 2017113662032, dated Jul. 21, 2020, 24 pages, (Submitted with Machine Translation).

State Intellectual Property Office of the People's Republic of China, Office Action and Search Report Issued in Application No. 2017113662047, dated Aug. 13, 2020, 17 pages, (Submitted with Machine Translation).

ISA State Intellectual Property Office of the People's Republic of China, Written Opinion of the International Searching Authority Issued in Application No. PCT/CN2018/117234, dated Feb. 25, 2019, WIPO, 9 pages.

Canada Patent Office, Office Action Issued in Application No. 3086236, dated Aug. 10, 2021, 6 pages.

State Intellectual Property Office of the People's Republic of China, Office Action and Search Report Issued in Application No. 2017113662032, dated Dec. 3, 2020, 18 pages, (Submitted with Machine Translation).

State Intellectual Property Office of the People's Republic of China, Office Action and Search Report Issued in Application No. 2017113662047, dated Dec. 4, 2019, 21 pages, (Submitted with Machine Translation).

ISA State intellectual Property Office of the People's Republic of China, International Search Report issued in Application No. PCT/CN2018/117234, dated Feb. 25, 2019, WIPO, 5 pages.

\* cited by examiner

ENCRYPTED STORAGE OF DATA

CROSS REFERENCE TO RELATED APPLICATIONS

This application is a National Stage of International Application No. PCT/CN2018/117234 filed on Nov. 23, 2018 which claims priority to Chinese Patent Application No. 201711366204.7, entitled "METHOD AND APPARATUS OF ENCRYPTED STORAGE OF DATA AND COMPUTING DEVICE" and Chinese Patent Application No. 201711366203.2, entitled "METHOD AND APPARATUS OF HIERARCHICAL STORAGE OF DATA AND COMPUTING DEVICE", filed on Dec. 18, 2017, the entire contents of which are incorporated herein by reference.

FIELD

The present disclosure relates to the field of Internet technologies, and in particular, to a data storage method and apparatus and a computing device.

BACKGROUND

With the popularization of the Internet, especially, mobile networks, an increasingly large number of products and service providers choose to use an application (APP) as a channel for interaction with consumers. People tend to choose an APP over a conventional personal computer (PC) to acquire information ever since. Important data may be placed on a server during the acquisition of information via a web page on a PC. In comparison, some sensitive data needs to be locally stored on a client during the use of an APP and as a result is prone to attacks by a hacker, leading to the leakage of locally stored sensitive information of a user. Frequent security matters on mobile terminals in recent years may also reflect that the security of storage and encryption of local data on clients becomes increasingly important.

At present, generally two manners of storing local data may be used on many commercially available APPs. In the first manner, sensitive data is locally stored in plaintext on a client. That is, sensitive information of a user is directly locally stored on a client without any processing. This manner is clearly riddled with severe security holes. In the second manner, local sensitive data is encrypted and stored on a client. That is, the client encrypts the sensitive data by using an encryption key generated based on a preset code and stores encrypted data. Both the used encryption key and the generated encrypted data are stored in a single local medium, resulting in a risk of brute-force cracking. In addition, in both manners, same type of data is always stored in one manner, and security levels cannot be dynamically updated.

SUMMARY

The present disclosure provides a method and an apparatus of encrypted storage of data and a computing device, to at least resolve to a certain extent one or more problems caused by limitations and deficiencies in the related art.

Other characteristics and advantages of the present disclosure become obvious through the following detailed description or is partially obtained through the practice of the present disclosure.

According to a first aspect of the embodiments of the present disclosure, a method of encrypted storage of data is provided, applied to a client having an APP installed thereon. The method includes: generating an encryption key based on a preset algorithm; dividing the encryption key into m portions, and respectively storing the portions in m storage media of the client, where m is a natural number greater than 1; encrypting target data by using the encryption key to obtain encrypted data; and storing the encrypted data.

According to a second aspect of the embodiments of the present disclosure, another method of encrypted storage of data is provided, applied to a client having an APP installed thereon. The method includes: encrypting data of a target field by using a first encryption key according to a first risk control level corresponding to the target field to obtain first encrypted data; and dividing the first encryption key into $n_1$ portions, and respectively storing the portions in $n_1$ media of the client, where $n_1$ is a natural number greater than 1.

According to a third aspect of the embodiments of the present disclosure, an apparatus of encrypted storage of data is provided, applied to a client having an APP installed thereon. The apparatus includes: a generation device, configured to generate an encryption key based on a preset algorithm; a division device, configured to: divide the encryption key into m portions, and respectively store the portions in m media of the client, where m is a natural number greater than 1; and an encryption device, configured to: encrypt target data by using the encryption key to obtain encrypted data, and store the encrypted data.

According to a fourth aspect of the embodiments of the present disclosure, another apparatus of encrypted storage of data is provided, applied to a client having an APP installed thereon. The apparatus includes: an encryption device, configured to encrypt data of a target field by using a first encryption key according to a first risk control level corresponding to the target field to obtain first encrypted data; and a division device, configured to: divide the first encryption key into $n_1$ portions, and respectively store the portions in $n_1$ media of the client, where $n_1$ is a natural number greater than 1.

According to a fifth aspect of the embodiments of the present disclosure, a storage medium storing a computer program is provided, where when executed by a processor of a client, the computer program enables the client to perform the method in any foregoing embodiment.

According to a sixth aspect of the embodiments of the present disclosure, a computing device is provided, including: a processor; and a storage medium, storing instructions executable by the processor, where the processor is configured to perform the method in any foregoing embodiment.

In the solution of encrypted storage of data in the embodiments of the present disclosure, a used encryption key and/or obtained encrypted data during the storage of data is divided, and multi-medium fragmented storage is correspondingly performed, improving the security of data storage.

It should be understood that the above general descriptions and the following detailed descriptions are merely for exemplary and explanatory purposes, and cannot limit the present disclosure.

DETAILED DESCRIPTION OF THE EMBODIMENTS

Embodiments of this application are clearly described in the following with reference to the accompanying drawings. Apparently, the embodiments to be described are merely a part rather than all of the embodiments of this application.

Embodiments of the present disclosure may be implemented as a system, an apparatus, a device, a method or a computer program product. Therefore, the present disclosure may be specifically implemented in the following forms, that is, the form of complete hardware, complete software (including firmware, resident software, micro code, and the like) or a combination of hardware and software.

According to implementations of the present disclosure, a data storage method and apparatus, a medium, and a computing device are provided.

Figure 1:
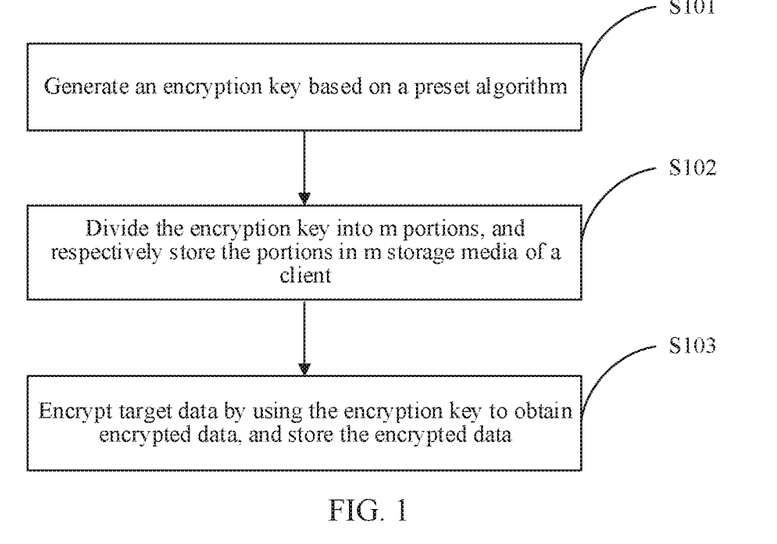
FIG. 1 is a flowchart of a method of encrypted storage of data according to an embodiment of the present disclosure.

FIG. 1 is a flowchart of a method of encrypted storage of data according to an embodiment of the present disclosure. As shown in FIG. 1, the method in this embodiment includes the following steps S101 to S103. In an embodiment, the method in this embodiment may be performed by a client (for example, a mobile phone) having an APP installed thereon.

Step S101: Generate an encryption key based on a preset algorithm.

In an embodiment, after the APP is installed on the client, the client may generate a unique encryption key based on the preset algorithm when a user launches the APP for the first time. Subsequently, key data that needs to be locally stored on the client by the APP may be encrypted by using the encryption key. For example, a symmetric encryption key of AES-256 is generated by using a Universally Unique Identifier (UUID) of the client, a current timestamp, and a local preset key according to a keyed-hash message authentication code (HMAC) (SHA-256) algorithm.

However, the embodiments of the present disclosure are not only limited thereto. For different types of key data, the APP may further separately generate different encryption keys based on a plurality of preset algorithms. Details are not described herein again.

Step S102: Divide the encryption key into m portions, and respectively store the portions in m storage media of the client, where m is a natural number greater than 1.

In a conventional manner, an encryption key is only stored in a single storage medium. In comparison, a plurality of storage media are used to perform fragmented storage of a generated encryption key in this embodiment, reducing the risk of cracking. In an embodiment, the foregoing generated encryption key may be processed based on a fragmentation algorithm, for example, a Base 64 operation, to perform cutting to generate a 32-bit Base 64 character string. In this way, the foregoing generated encryption key is divided into a plurality of portions, and the portions are respectively stored in different storage media of a client device.

In an embodiment, the m storage media include different storage media on the client, different storage locations on the same storage medium or both. For example, for the APP installed on the client, the m storage media may be any combination selected from storage media indicated by the following identifiers: a key chain KeyChain, a file folder File, and user default UserDefaults. However, the present disclosure is not limited thereto. KeyChain is a relatively independent space corresponding to the APP on the storage media of the client. Information stored in KeyChain is not deleted during the update of the APP, so that KeyChain is usually used to store confidential information of the user. UserDefaults is usually used to store a user configuration file corresponding to the APP. File is used to store a nonconfidential file downloaded or generated during the use of the APP by the user.

Step S103: Encrypt target data by using the encryption key to obtain encrypted data, and store the encrypted data.

When the APP currently needs to locally store key data, the client first retrieves portions of the encryption key from the m storage media of the client and assembles the portions into the encryption key based on an inverse operation of step S102, and further uses the encryption key to perform an encryption operation on the foregoing key data, to obtain the encrypted data for storage.

In the method of encrypted storage of data in the foregoing embodiments, a used encryption key during the storage of data is divided, and multi-medium fragmented storage is correspondingly performed, improving the security of data storage.

Figure 2:
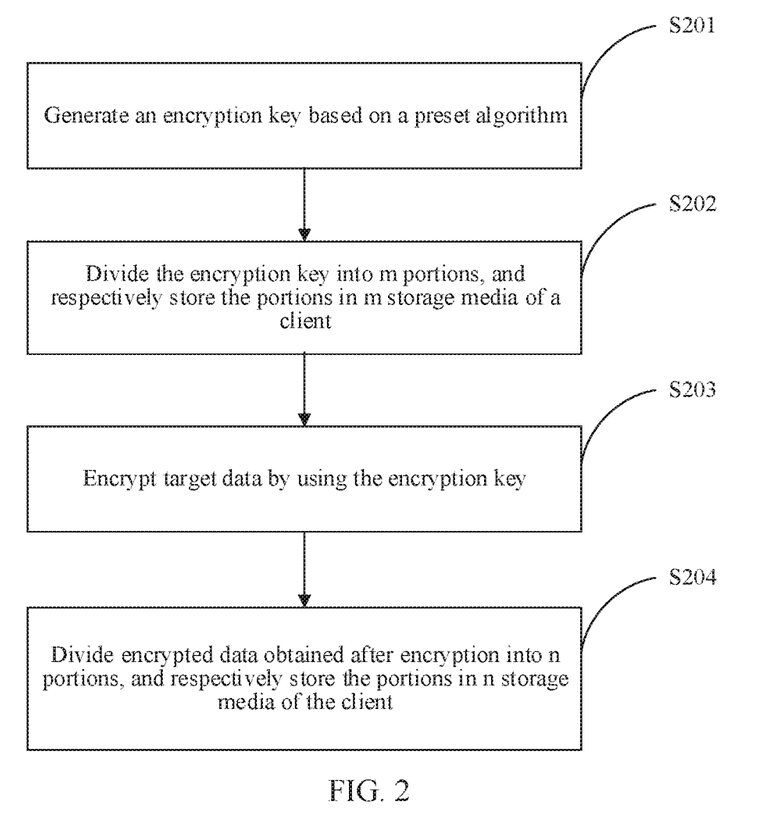
FIG. 2 is a flowchart of a method of encrypted storage of data according to another embodiment of the present disclosure.

FIG. 2 is a flowchart of a method of encrypted storage of data according to another embodiment of the present disclosure. As shown in the figure, the method in this embodiment includes the following steps S201 to S204.

Step S201: Generate an encryption key based on a preset algorithm.

Step S202: Divide the encryption key into m portions, and respectively store the portions in m storage media of the client, where m is a natural number greater than 1.

Step S203: Encrypt target data by using the encryption key.

The foregoing steps S201 to S203 respectively correspond to steps S101 to S103 in the foregoing embodiment. Details are not described herein again.

Step S204: Divide encrypted data obtained after encryption into n portions, and respectively store the portions in n storage media of the client, where n is a natural number greater than 1.

The concept of performing multi-medium fragmented storage on an encryption key in the foregoing embodiment is still used. Multi-medium fragmented storage is further performed on the encrypted data obtained through encryption in this embodiment, further reducing the risk of cracking. In an embodiment, the n storage media in step S204 and the m storage media in step S202 may include a plurality of identical storage media or may be selected from different storage medium ranges, for example, may both be any combination selected from storage media indicated by the following identifiers: KeyChain, File, and UserDefaults.

In the method of encrypted storage of data in the embodiments, a used encryption key and the encrypted data obtained through division during the storage of data is divided, and multi-medium fragmented storage is correspondingly performed, improving the security of data storage.

Figure 3A:
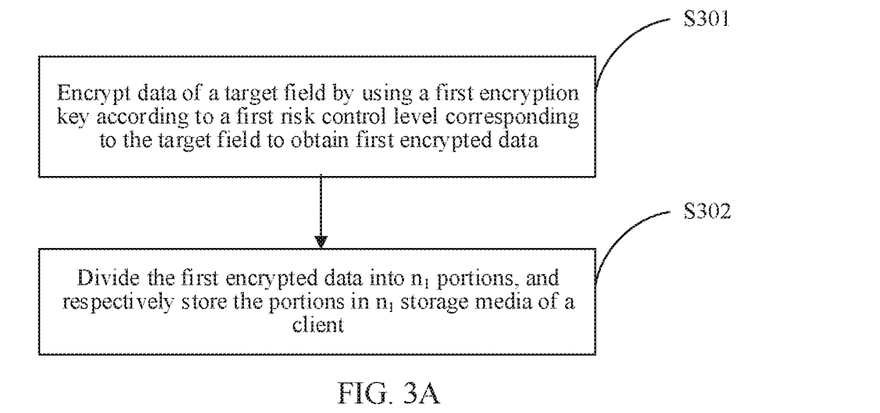
FIG. 3A is a flowchart of a method of encrypted storage of data according to still another embodiment of the present disclosure.

FIG. 3A is a flowchart of a method of encrypted storage of data according to still another embodiment of the present disclosure. As shown in the figure, the method in this embodiment includes the following steps S301 and S302.

Step S301: Encrypt data of a target field by using a first encryption key according to a first risk control level corresponding to the target field to obtain first encrypted data.

Step S302: Divide the first encrypted data into $n_1$ portions, and respectively store the portions in $n_1$ media of the client, where $n_1$ is a natural number greater than 1.

In step S301, the first encryption key may be generated based on a preset algorithm, and the first encryption key may be divided into $m_1$ portions, and the portions are respectively stored in $m_1$ media of the client, where $m_1$ is a natural number greater than 1.

Figure 3B:
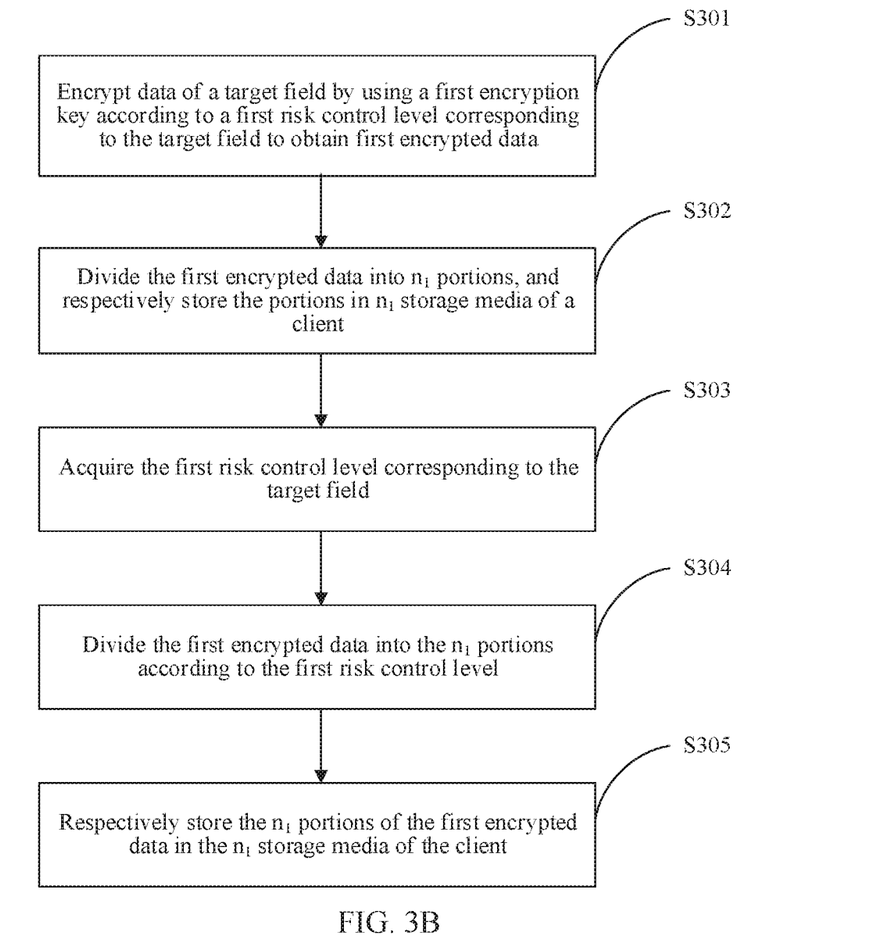
FIG. 3B is a flowchart of a method of encrypted storage of data according to still another embodiment of the present disclosure.

FIG. 3B is a flowchart of a method of encrypted storage of data according to still another embodiment of the present disclosure. As shown in the figure, the method in this embodiment includes the following steps S301 to S305.

The foregoing steps S301 and S302 respectively correspond to steps S301 and S302 in the embodiment in FIG. 3A. Details are not described herein again.

Step S303: Acquire the first risk control level corresponding to the target field.

For key data that needs to be locally stored on the client, there may be different encryption requirements for different data attributes. For example, conventional data such as a user name and a password requires normal-level encryption, and data such as a bank account, a credit card number, and a payment password requires higher-level encryption. In this embodiment, the design of risk control levels is introduced to implement different levels of encryption of different types of key data.

In an embodiment, a risk control level corresponding to each type of target data may be preset and stored in an APP (that is, locally on the client). In another embodiment, a server that communicates with the client may further feed back a risk control level corresponding to the target data in real time, to facilitate more flexible level setting and update. For example, when a key field that is received by the APP through the client and is inputted by a user needs to be locally stored, the client communicates with the server, and the server returns a risk control level corresponding to data of the key field. For another example, when the APP needs to acquire a key field from the server and locally store the key field, the server may return data of the key field and add a corresponding risk control level to the data.

Step S304: Divide the first encrypted data into the $n_1$ portions according to the first risk control level.

Step S305: Respectively store the $n_1$ portions of the first encrypted data in the $n_1$ storage media of the client.

Figure 3C:
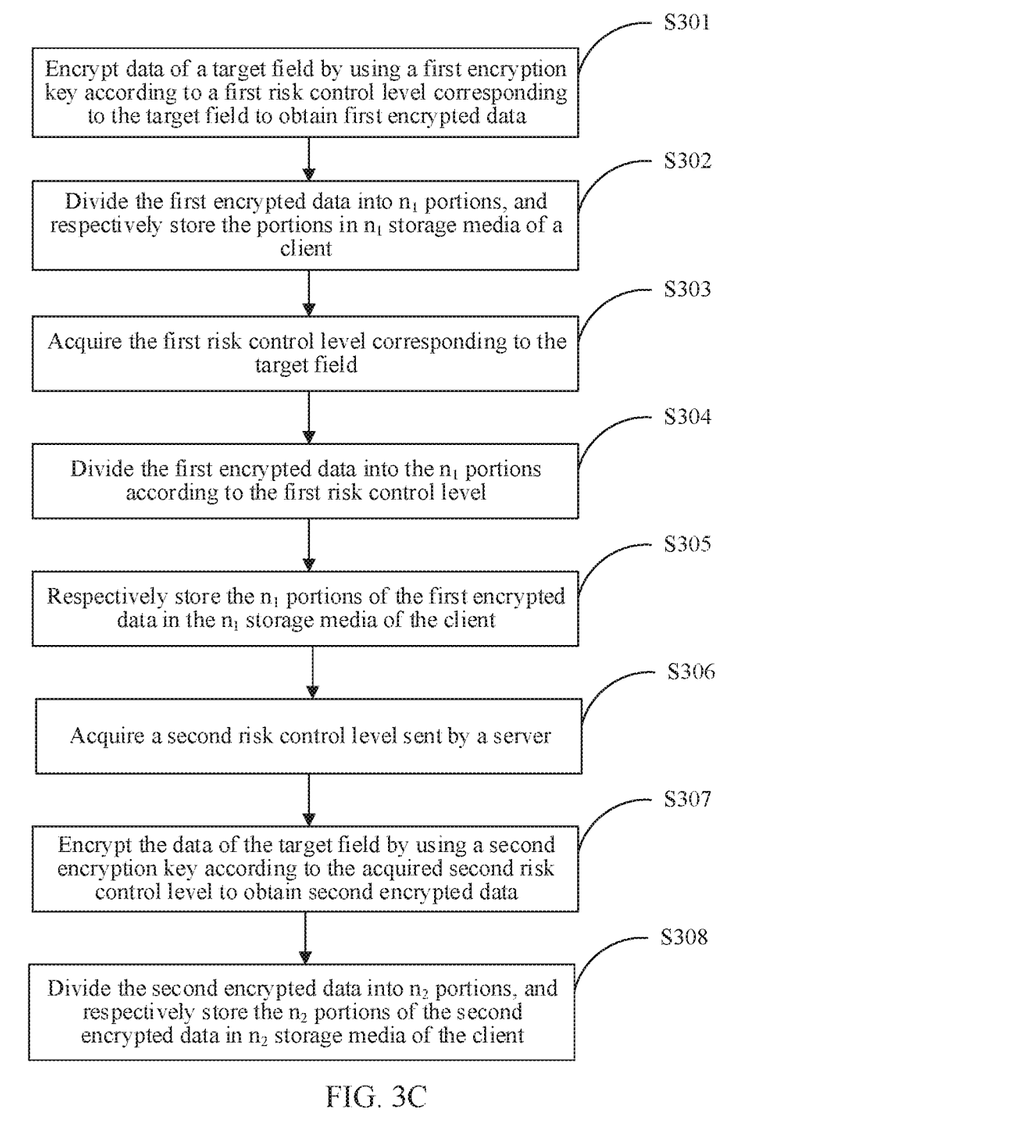
FIG. 3C is a flowchart of a method of encrypted storage of data according to yet another embodiment of the present disclosure.

FIG. 3C is a flowchart of a method of encrypted storage of data according to still another embodiment of the present disclosure. As shown in the figure, the method in this embodiment includes the following steps S301 to S308.

The foregoing steps S301 to S305 respectively correspond to steps S301 to S305 in the embodiment in FIG. 3B. Details are not described herein again.

Step S306: Acquire a second risk control level sent by a server, where the second risk control level is different from the first risk control level.

Data of a field is always processed by using the same encryption manner (for example, is always encrypted and stored or is always stored in plaintext). In comparison, in this embodiment, a risk control level of a field may be dynamically updated according to a preset trigger condition. The server that communicates with the client may send the updated risk control level to the client. The updated risk control level ma be referred to as the second risk control level. The trigger condition for triggering the server to update a risk control level may include that the APP performs update locally based on a detected preset event (for example, a suspected attack event such as repeated input of incorrect passwords) or may include that the server performs update based on a global setting (for example, a maintenance person temporarily raises a risk control level upon discovering a software hole). This is not limited in the present disclosure. Details are not described herein.

In this step, the APP acquires, based on a local trigger of the client or a trigger of the server, the second risk control level updated and set for the target field. For example, when the APP acquires a notification for reducing a risk control level of a user name field from the server, the user name field is changed from a default risk control level (the first risk control level, for example, the second highest risk control level) to a lower risk control level (the second risk control level, for example, the lowest risk control level) in local system entries.

Step S307: Encrypt the data of the target field by using a second encryption key according to the acquired second risk control level to obtain second encrypted data.

Step S308: Divide the second encrypted data into $n_2$ portions, and respectively store the $n_2$ portions of the second encrypted data in $n_2$ media of the client, where $n_2$ is a natural number, when the first risk control level is higher than the second risk control level, $n_1 > n_2$, and when the first risk control level is lower than the second risk control level, $n_1 < n_2$.

In an embodiment, the second encryption key used in step S307 may be generated based on the preset algorithm. The second encryption key may be divided into $m_2$ portions, and the portions may be respectively stored in $m_2$ media of the client, where $m_2$ is a natural number greater than 1.

For example, in the foregoing embodiment, the first risk control level is the second highest risk control level, and the second highest risk control level is the lowest risk control level. It is assumed that the first encrypted data is divided into two portions ($n_1=2$) according to the first risk control level, and the second encrypted data is not divided according to the second risk control level ($n_2=1$). In Step S302, the APP divides the first encrypted data into two portions, and respectively stores the two portions of the first encrypted data in two media of the client. In step S308, the APP does not divide the second encrypted data and directly store the complete second encrypted data in one medium of the client.

The updated risk control level for the target field is acquired and the data of the target field is encrypted and stored again according to the updated risk control level to implement flexible adjustment and dynamic update of a security level of sensitive data. In addition, encrypted data obtained by encrypting local data on the client is divided according to the risk control level, and multi-medium fragmented storage is correspondingly performed, improving the security of data storage on the client.

In an embodiment, after changing the risk control level stored for the target field in system entries, the APP then encrypts and stores the data of the target field again based on the updated second risk control level.

Herein, if the data of the target field is not changed, for example, the APP may use the first encryption key to restore the data of the target field from the first encrypted data; then encrypt the restored data of the target field by using the second encryption key according to the second risk control level to obtain the second encrypted data; and delete the first encrypted data.

In another embodiment, if the data of the target field is also updated, the APP may directly delete the original first encrypted data, and then encrypt and store the updated data again based on the second risk control level. For example, when the server notifies to raise the risk control level of a security certificate, the server also sends an updated security certificate. Upon receiving the foregoing notification, the APP may delete the original security certificate for first encryption and storage, and perform second encryption and storage on the new security certificate.

According to the method of level-based encrypted storage of data in the foregoing embodiment, the updated risk control level is acquired to encrypt and store data of the same target field again on a corresponding level, to implement flexible and dynamic update of a security level of sensitive data.

Corresponding to encryption requirements of different risk control levels, different quantities of portions of encrypted data and storage media are provided in this embodiment. For example, for an encryption requirement of the highest level, the encrypted data may be divided into three portions, and the three portions are respectively stored in storage media indicated by KeyChain, File, and UserDefaults. For an encryption requirement with the second highest level, the encrypted data may be divided into two portions, and the two portions may be respectively stored in storage media indicated by KeyChain and File. For an encryption requirement with the lowest level, the encrypted data may be stored in the storage medium indicated by UserDefaults without fragmentation (or it may be understood that the encrypted data is one portion obtained from division).

According to the method of encrypted storage of data in the embodiments, a used encryption key and encrypted data obtained through division during the storage of data is divided, multi-medium fragmented storage is correspondingly performed, and the design of risk control levels is introduced to implement different levels of encryption of different types of key data, improving the security and flexibility of data storage.

Figure 4:
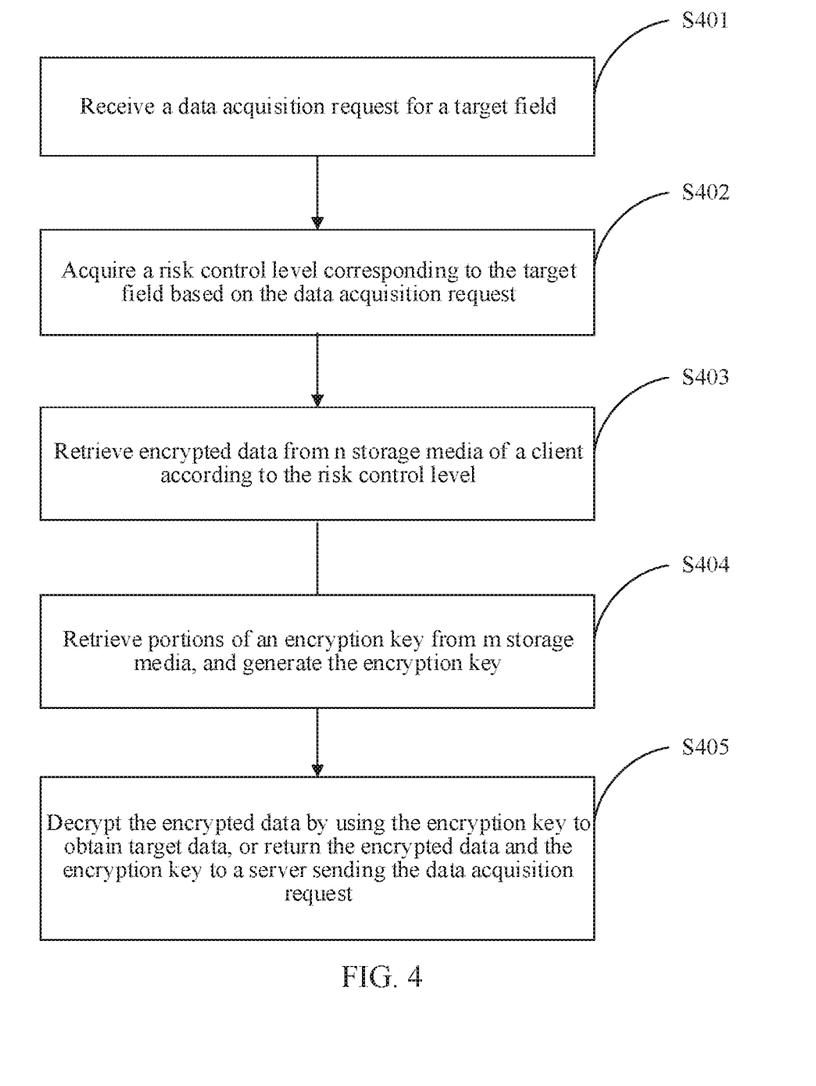
FIG. 4 is a flowchart of a method of encrypted storage of data according to yet another embodiment of the present disclosure.

FIG. 4 is a flowchart of a method of encrypted storage of data according to yet another embodiment of the present disclosure. A decryption procedure corresponding to an encryption procedure in the embodiment in FIG. 3 is provided in this embodiment. As shown in the figure, the method in this embodiment includes the following steps S401 to S404.

Step S401: Receive a data acquisition request for a target field.

Step S402: Acquire a risk control level corresponding to the target field based on the data acquisition request.

When the APP needs to decrypt locally stored key data, an inverse operation corresponding to an encryption process needs to be completed. The embodiments in FIG. 3A to FIG. 3C relate to different levels of encryption of different types of key data. Therefore, before the key data is decrypted in this embodiment, a risk control level corresponding to the key data needs to be acquired first.

In an embodiment, for example, the risk control level is locally stored on the client in the form of mapping entries together with a field name of the key data. For example, when the APP needs to acquire a user name and a password that are locally stored to verify inputted data of a current user, the foregoing mapping entries are searched for field names "user name" and "password" to acquire a corresponding risk control level.

In addition, the data acquisition request in step S401 may be generated by the APP based on a local requirement (for example, the foregoing user name and password verification) or may be from the server that communicates with the client. For example, for a bank account and a payment password, the APP needs to locally perform verification, and the server further needs to communicate with a corresponding bank server for verification. In this case, the server may generate the foregoing data acquisition request and send the data acquisition request to the client.

Step S403: Retrieve encrypted data from n storage media of the client according to the risk control level.

The step may be considered as an inverse process of step S306 in the foregoing embodiment. For example, the following operations are performed based on different risk control levels acquired in step S402: When the highest level is acquired, the portions of the encrypted data are respectively retrieved from the storage media indicated by KeyChain, File. and UserDefaults and assembled to generate the complete encrypted data. When the second highest level is acquired, the portions of the encrypted data are respectively retrieved from the storage media indicated by KeyChain and File and assembled to generate the complete encrypted data. When the lowest level is acquired, the complete encrypted data may be directly retrieved from the storage medium indicated by UserDefaults.

Step S404: Retrieve portions of an encryption key from m storage media, and generate the encryption key.

For example, when the APP determines, based on a preset rule, that the encryption key is divided into three portions, the portions of the encryption key are respectively retrieved from the storage media indicated by KeyChain, File, and UserDefaults and assembled to generate the complete encryption key.

Step S405: Decrypt the encrypted data by using the encryption key to obtain target data, or return the encrypted data and the encryption key to a server sending the data acquisition request.

Corresponding to different sources of data acquisition requests, Step S405 includes two different implementations.

In an embodiment, when the data acquisition request is locally generated by the APP, in this step, the encryption key obtained in step S404 is directly used to perform decryption processing on the encrypted data obtained in step S403, to obtain the target data.

In another embodiment, when the data acquisition request is from the server, decryption processing is not performed in this step. Instead, the encrypted data obtained in step S403 by using the encryption key obtained in step S404 is sent to the foregoing server. Further, before the encryption key and the encrypted data obtained in the foregoing step are sent to the server, encryption processing may further be performed on the encryption key and the encrypted data again. For example, the manner of Advanced Encryption Standard (AES) followed by Rivest-Shamir-Adleman (RSA) is used to encrypt the encryption key and the encrypted data. Two generated values (which respectively correspond to the encryption key and the encrypted data) are sent to the server. The server performs decryption by using an inverse operation to eventually obtain the target data.

It should be noted that although the steps of the method in the present disclosure are described in the accompanying drawings in a specific order, it does not require or imply that the steps must be performed in the specific order or all the shown steps must be performed before an expected result is obtained. Additionally or alternatively, some steps may be omitted, and some steps are combined into one step to be performed, and/or one step is divided into a plurality of steps to be performed. In addition, it is also easily understood that these steps may be, for example, synchronously or asynchronously performed in a plurality of devices/processes/threads.

An exemplary implementation further provides an apparatus of encrypted storage of data.

Figure 5:
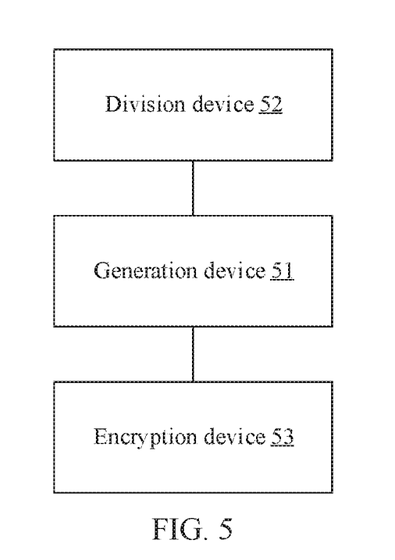
FIG. 5 is a schematic block diagram of an apparatus of encrypted storage of data according to an embodiment of the present disclosure.

FIG. 5 is a schematic block diagram of an apparatus of encrypted storage of data according to an embodiment of the present disclosure. The apparatus in this embodiment is applied to a client with an APP. As shown in the figure, the apparatus includes a generation device 51, a division device 52, and an encryption device 53.

In an embodiment, the generation device 51 is configured to generate an encryption key based on a preset algorithm. The division device 52 is configured to: divide the encryption key into m portions, and respectively store the portions in m storage media of the client, where m is a natural number greater than 1. The encryption device 53 is configured to: encrypt target data by using the encryption key to obtain encrypted data, and store the encrypted data.

In an embodiment, the m storage media include different storage media on the client, different storage locations on the same storage medium or both. For example, for an APP installed on the client, the m storage media may be any combination selected from storage media indicated by the following identifiers: KeyChain, File, and UserDefaults. However, the present disclosure is not limited thereto.

According to the apparatus of encrypted storage of data in the foregoing embodiments, a used encryption key during the storage of data is divided, and multi-medium fragmented storage is correspondingly performed, improving the security of data storage.

Figure 6:
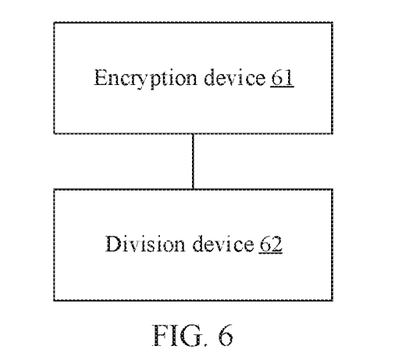
FIG. 6 is a schematic block diagram of an apparatus of encrypted storage of data according to another embodiment of the present disclosure.

FIG. 6 is a schematic block diagram of an apparatus of encrypted storage of data according to another embodiment of the present disclosure. The apparatus in this embodiment is applied to a client with an APP. As shown in the figure, the apparatus includes an encryption device 61 and a division device 62.

In an embodiment, the encryption device 61 is configured to encrypt data of a target field by using a first encryption key according to a first risk control level corresponding to the target field to obtain first encrypted data. The division device 62 is configured to: divide the first encryption key into $n_1$ portions, and respectively store the portions in $n_1$ storage media of the client, where $n_1$ is a natural number greater than 1.

In an embodiment, the $n_1$ storage media include different storage media on the client, different storage locations on the same storage medium or both. For example, for an APP installed on the client, the $n_1$ media may be any combination selected from storage media indicated by the following identifiers: KeyChain, File, and UserDefaults. However, the present disclosure is not limited thereto.

According to the apparatus of encrypted storage of data in the embodiments, obtained encrypted data during the storage of data is divided, and multi-medium fragmented storage is correspondingly performed, improving the security of data storage.

Figure 7:
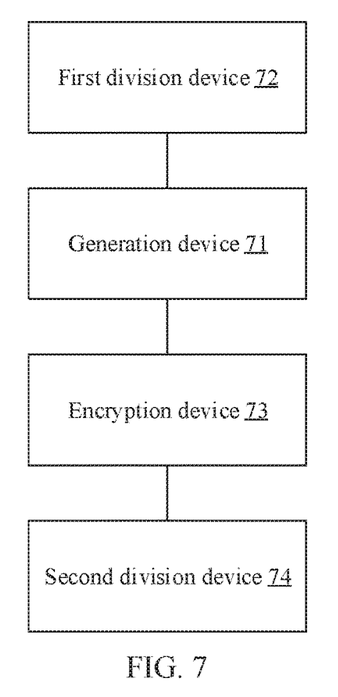
FIG. 7 is a schematic block diagram of an apparatus of encrypted storage of data according to still another embodiment of the present disclosure.

FIG. 7 is a schematic block diagram of an apparatus of encrypted storage of data according to still another embodiment of the present disclosure. The apparatus in this embodiment is applied to a client with an APP. As shown in the figure, the apparatus includes a generation device 71, a first division device 72, an encryption device 73, and a second division device 74.

In an embodiment, the generation device 71 is configured to generate an encryption key based on a preset algorithm. The first division device 72 is configured to: divide the encryption key into m portions, and respectively store the portions in m storage media of the client, where m is a natural number greater than 1. The encryption device 73 is configured to: encrypt target data by using the encryption key to obtain encrypted data. The second division device 74 is configured to: divide the encrypted data into n portions, and respectively store the portions in n storage media of the client, where n is a natural number greater than 1.

In an embodiment, the m storage media include different storage media on the client, different storage locations on the same storage medium or both. For example, for an APP installed on the client, the m storage media may be any combination selected from storage media indicated by the following identifiers: KeyChain, File, and UserDefaults. However, the present disclosure is not limited thereto. The n storage media and the m storage media may include a plurality of identical storage media or may be selected from different storage medium ranges, for example, may both be any combination selected from storage media indicated by the following identifiers: KeyChain, File, and UserDefaults.

According to the apparatus of encrypted storage of data in the embodiments, a used encryption key and obtained encrypted data during the storage of data is divided, and multi-medium fragmented storage is correspondingly performed, improving the security of data storage.

Specific manners for devices in the apparatus in the foregoing embodiment to perform operations have been described in detail in the embodiments of the method. Details are not described herein again.

It should be noted that although a plurality of devices or units of a device configured to perform actions are discussed in the foregoing detailed description, such division is not mandatory. In practice, according to the implementations of the present disclosure, the features and functions of two or more devices or units described above may be embodied in one device or unit. Conversely, the features or functions of one device or unit described above may further be divided and embodied by a plurality of devices or units. The components shown as devices or units may or may not be physical units, may be located in one position, or may be distributed on a plurality of network units. Some or all of the devices may be selected according to practical requirements to achieve the objectives of the present disclosure. A person of ordinary skill in the art may understand and implement the objective without creative efforts.

Embodiments described above may be implemented by software or may be implemented in the form of software in combination with necessary hardware.

For example, in an exemplary implementation, a machine-readable storage medium is further provided, storing a machine-readable program, when being executed by a processor, the program implementing the steps of the method in any foregoing embodiment. For specific steps of the method, reference may be made to the detailed description of the foregoing embodiments. Details are not described herein again. The machine-readable storage medium may be a read-only memory (ROM), a random access memory (RAM), a compact disc read-only memory, a magnetic tape, a floppy disk, an optical data storage device, or the like.

Figure 8:
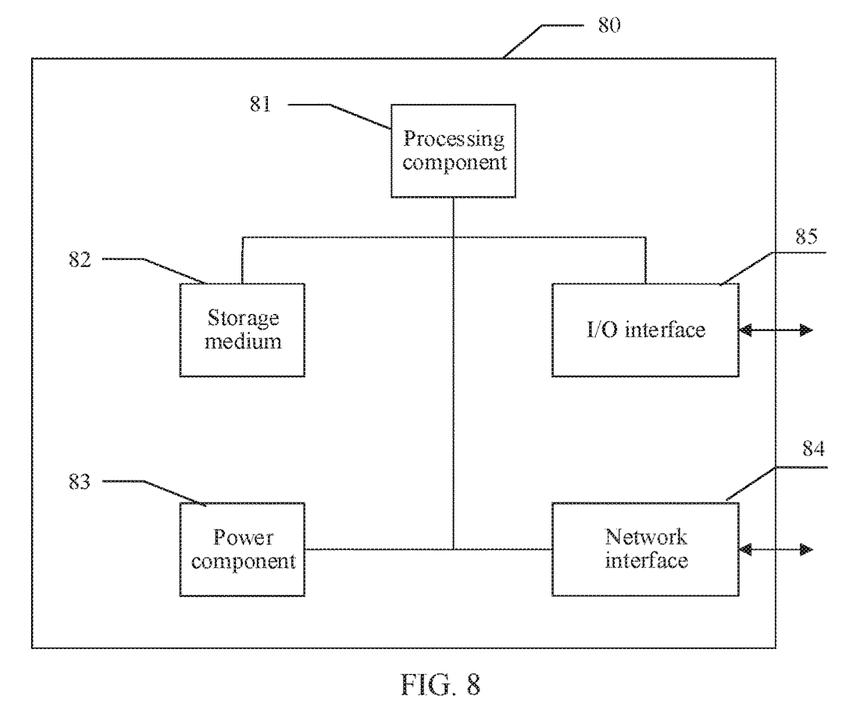
FIG. 8 is a schematic block diagram of a computing device according to an embodiment of the present disclosure.

In another exemplary implementation, a computing device is further provided. The device may be a mobile terminal such as a mobile phone or a tablet computer or may be a terminal device such as a desktop computer or a server. This is not limited in this exemplary implementation. FIG. 8 is a schematic diagram of a computing device 80 according to an exemplary implementation of the present disclosure. For example, the device 80 may be provided as a mobile terminal. Referring to FIG. 8, the device 80 includes: a processing component 81, the processing component 81 further including one or more processors, and a storage resource represented by a storage medium 82, the memory resource being used for storing instructions, for example, an APP, that can be executed by the processing component 81. The APP stored in the storage medium 82 may include one or more devices, each of which corresponds to a set of instructions. In addition, the processing component 81 is configured to execute instructions, to perform the foregoing method of encrypted storage of data. For the steps of the method, reference may be made to the detailed description of the foregoing method embodiments. Details are not described herein again.

The device 80 may further include: a power component 83, configured to manage power supply of the device 80, a wired or wireless network interface 84, configured to connect the device 80 to a network, and an input/output (I/O) interface 85. The device 80 may operate an operating system stored in the storage medium 82, for example, Android or iOS.

The invention claimed is:

1. A method of encrypted storage of data, applied to a client having an application (APP) installed thereon, the method comprising:
    encrypting data of a target field by using a first encryption key according to a first risk control level corresponding to the target field to obtain first encrypted data; and
    dividing the first encrypted data into $n_1$ portions according to the first risk control level, and respectively storing the $n_1$ portions in $n_1$ media of the client, wherein $n_1$ is a natural number greater than 1; and,
    wherein the method further comprises:
    acquiring a second risk control level sent by a server, wherein the second risk control level is different from the first risk control level;
    re-encrypting the data of the target field by using a second encryption key according to the acquired second risk control level to obtain second encrypted data;
    dividing the second encrypted data into $n_2$ portions; and
    respectively storing the $n_2$ portions of the second encrypted data in $n_2$ media of the client, wherein $n_2$ is a natural number, $n_1 > n_2$ when the first risk control level is higher than the second risk control level, and $n_1 < n_2$ when the first risk control level is lower than the second risk control level.

2. The method according to claim 1, wherein the method further comprises:
    generating the first encryption key based on a preset algorithm; and
    dividing the first encryption key into $m_1$ portions, and respectively storing the portions in $m_1$ media of the client, wherein $m_1$ is a natural number greater than 1.

3. The method according to claim 1, wherein the method further comprises:
    generating the second encryption key based on a preset algorithm; and
    dividing the second encryption key into $m_2$ portions, and respectively storing the portions in $m_2$ media of the client, wherein $m_2$ is a natural number greater than 1.

4. The method according to claim 3, wherein encrypting the data of the target field by using the second encryption key according to the acquired second risk control level to obtain the second encrypted data comprises:
    restoring the data of the target field from the first encrypted data by using the first encryption key;
    encrypting the restored data of the target field by using the second encryption key according to the second risk control level to obtain the second encrypted data; and
    deleting the first encrypted data.

5. The method according to claim 3, wherein the method further comprises:
    receiving a data acquisition request for the target field;
    acquiring the second risk control level corresponding to the target field based on the data acquisition request;
    reading the second encrypted data from the media of the client according to the second risk control level;
    reading the second encryption key from the client; and
    decrypting the second encrypted data by using the second encryption key to obtain target data; or returning the second encrypted data and the second encryption key to the server sending the data acquisition request.

6. The method according to claim 5, wherein reading the second encrypted data from the media of the client according to the second risk control level comprises:
    respectively reading the $n_2$ portions of the second encrypted data from the $n_2$ media of the client according to the second risk control level; and
    assembling the $n_2$ portions into the complete second encrypted data.

7. The method according to claim 5, wherein reading the second encryption key from the media of the client according to the second risk control level comprises:
    respectively reading the $m_2$ portions of the second encryption key from the $m_2$ media according to the second risk control level; and
    assembling the $m_2$ portions into the complete second encryption key.

8. The method according to claim 1, wherein the method further comprises:
    acquiring updated data sent by a server for the target field;
    determining a second risk control level different from the first risk control level based on the updated data;
    encrypting the updated data by using a second encryption key according to the second risk control level to obtain second encrypted data;
    dividing the second encrypted data into $n_2$ portions; and
    respectively storing the $n_2$ portions of the second encrypted data in $n_2$ media of the client, wherein $n_2$ is a natural number, when the first risk control level is higher than the second risk control level, $n_1 > n_2$, and when the first risk control level is lower than the second risk control level, $n_1 < n_2$.

9. The method according to claim 1, wherein the $n_1$ media are any combination selected from media indicated by the following identifiers: a key chain (KeyChain), a file folder (File), and user defaults (UserDefaults).

10. A storage medium storing a computer program, wherein when executed by a processor of a client, the computer program enables the client to perform the method according to claim 1.

11. A computing device, comprising:
a processor; and
a storage medium, storing instructions executable by the processor, wherein
by executing the instructions, the processor is caused to:
encrypt data of a target field by using a first encryption key according to a first risk control level corresponding to the target field to obtain first encrypted data; and
divide the first encrypted data into $n_1$ portions according to the first risk control level, and respectively store the $n_1$ portions in $n_1$ media of the client, wherein $n_1$ is a natural number greater than 1; and,
wherein the processor is further caused to:
acquire a second risk control level sent by a server, wherein the second risk control level is different from the first risk control level;
re-encrypt the data of the target field by using a second encryption key according to the acquired second risk control level to obtain second encrypted data;
divide the second encrypted data into $n_2$ portions; and
respectively store the $n_2$ portions of the second encrypted data in $n_2$ media of the client, wherein $n_2$ is a natural number, $n_1 > n_2$ when the first risk control level is higher than the second risk control level, and $n_1 < n_2$ when the first risk control level is lower than the second risk control level.

12. The device according to claim 11, wherein the processor is further caused to:
generate the first encryption key based on a preset algorithm; and
divide the first encryption key into $m_1$ portions, and respectively store the portions in $m_1$ media of the client, wherein $m_1$ is a natural number greater than 1.

13. The device according to claim 11, wherein the processor is further caused to:
generate the second encryption key based on a preset algorithm; and
divide the second encryption key into $m_2$ portions, and respectively store the portions in $m_2$ media of the client, wherein $m_2$ is a natural number greater than 1.

14. The device according to claim 13, wherein when encrypting the data of the target field by using the second encryption key according to the acquired second risk control level to obtain the second encrypted data, the processor is caused to:
restore the data of the target field from the first encrypted data by using the first encryption key;
encrypt the restored data of the target field by using the second encryption key according to the second risk control level to obtain the second encrypted data; and
delete the first encrypted data.

15. The device according to claim 13, wherein the processor is further caused to:
receive a data acquisition request for the target field;
acquire the second risk control level corresponding to the target field based on the data acquisition request;
read the second encrypted data from the media of the client according to the second risk control level;
read the second encryption key from the client; and
decrypt the second encrypted data by using the second encryption key to obtain target data; or return the second encrypted data and the second encryption key to the server sending the data acquisition request.

* * * * *